United States Patent
Wu (10) Patent No.: US 9,563,715 B2
(45) Date of Patent: Feb. 7, 2017

(54) METHOD FOR PERFORMING INFORMATION MONITORING CONTROL OF AT LEAST ONE TARGET DIVISION BLOCK OF AT LEAST ONE WEB PAGE WITH AID OF AT LEAST ONE MONITORING CONTROL SERVER, AND ASSOCIATED APPARATUS AND ASSOCIATED MONITORING SYSTEM

(75) Inventor: Kun-Da Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 828 days.

(21) Appl. No.: 13/543,875

(22) Filed: Jul. 8, 2012

(65) Prior Publication Data
US 2014/0009491 A1    Jan. 9, 2014

(51) Int. Cl.
*G06F 17/30* (2006.01)

(52) U.S. Cl.
CPC ............... *G06F 17/30899* (2013.01)

(58) Field of Classification Search
CPC   G06F 17/30861; G06F 17/3089; G06F 11/30; G06F 11/3068; G06F 11/32; G06F 11/323; G06F 17/30; G06F 17/30002; G06F 17/30876; G06F 17/30887; G06F 17/30899; G06F 17/30902; G06F 17/30905; G06F 9/4443; G06F 9/4445; G06F 3/048; G06F 3/0484
USPC ........................................................ 715/764
See application file for complete search history.

(56) References Cited

U.S. PATENT DOCUMENTS

| | | | |
|---|---|---|---|
| 6,044,393 A | | 3/2000 | Donaldson |
| 6,763,388 B1 * | | 7/2004 | Tsimelzon ............ 709/228 |
| 6,834,306 B1 * | | 12/2004 | Tsimelzon ........ G06F 17/30905 |
| | | | 707/E17.116 |
| 7,966,558 B2 * | | 6/2011 | Duncan et al. ............... 715/243 |
| 8,024,400 B2 * | | 9/2011 | Lin et al. ...................... 709/203 |
| 8,386,588 B1 * | | 2/2013 | Cooley ............. H04N 21/4668 |
| | | | 709/203 |

(Continued)

FOREIGN PATENT DOCUMENTS

| CN | 1120701 A | 4/1996 |
|---|---|---|
| CN | 101782913 A | 7/2010 |

(Continued)

OTHER PUBLICATIONS

Office action mailed on Jul. 4, 2014 for the Taiwan application No. 101142428, filing date Nov. 14, 2012, p. 1-7.

(Continued)

*Primary Examiner* — Maryam Ipakchi
(74) *Attorney, Agent, or Firm* — Winston Hsu; Scott Margo (57) ABSTRACT

A method for performing information monitoring control and an associated apparatus and an associated monitoring system are provided, where the method is applied to an electronic device, and the apparatus includes at least one portion of an electronic device. The method includes: detecting at least one target division block of at least one web page according to user gesture input information and determining subscription information corresponding to the target division block, wherein the web page including the target division block is provided by at least one web server; and sending the subscription information to at least one monitoring control server to subscribe to a monitored version of the target division block, for being displayed/output by utilizing the electronic device.

20 Claims, 5 Drawing Sheets

(56) References Cited

U.S. PATENT DOCUMENTS

| | | | |
|---|---|---|---|
| 8,407,576 B1* | 3/2013 | Yin et al. | 715/206 |
| 8,990,678 B2* | 3/2015 | Bedingfield, Sr. | G06F 17/3089 707/E17.116 |
| 2005/0216439 A1* | 9/2005 | Kawakita | G06F 17/3089 |
| 2005/0289468 A1* | 12/2005 | Kahn et al. | 715/738 |
| 2006/0274086 A1* | 12/2006 | Forstall et al. | 345/629 |
| 2006/0277460 A1* | 12/2006 | Forstall et al. | 715/513 |
| 2006/0277481 A1* | 12/2006 | Forstall et al. | 715/764 |
| 2007/0106952 A1* | 5/2007 | Matas | G06F 17/30905 715/764 |
| 2007/0226755 A1* | 9/2007 | Kilian-Kehr | G06F 9/542 719/318 |
| 2008/0016177 A1* | 1/2008 | Jin | G06F 17/30864 709/217 |
| 2008/0059537 A1* | 3/2008 | Sattler | G06F 8/67 |
| 2008/0155112 A1* | 6/2008 | Ma | H04L 12/1859 709/231 |
| 2008/0307301 A1* | 12/2008 | Decker et al. | 715/241 |
| 2008/0307308 A1* | 12/2008 | Sullivan et al. | 715/723 |
| 2009/0077171 A1* | 3/2009 | Kasha | G06F 17/30899 709/203 |
| 2009/0132942 A1* | 5/2009 | Santoro et al. | 715/765 |
| 2010/0138773 A1 | 6/2010 | Schechter | |
| 2010/0175011 A1* | 7/2010 | Song et al. | 715/769 |
| 2010/0250756 A1* | 9/2010 | Morris | G06F 17/30899 709/228 |
| 2011/0210907 A1* | 9/2011 | Martin-Cocher et al. | 345/1.3 |
| 2011/0244845 A1* | 10/2011 | Park | H04M 1/72552 455/419 |
| 2012/0066379 A1* | 3/2012 | Zhou et al. | 709/224 |
| 2012/0124175 A1* | 5/2012 | Yang | G06F 17/3089 709/219 |
| 2012/0140265 A1* | 6/2012 | Laursen | G06F 3/1204 358/1.15 |
| 2012/0166953 A1* | 6/2012 | Affronti et al. | 715/730 |
| 2012/0208593 A1* | 8/2012 | Yang et al. | 455/556.1 |
| 2014/0006526 A1* | 1/2014 | Jorasch | H04L 51/00 709/206 |

FOREIGN PATENT DOCUMENTS

| | | |
|---|---|---|
| TW | 200923718 | 6/2009 |
| TW | 201013512 | 4/2010 |
| TW | 201140374 | 11/2011 |

OTHER PUBLICATIONS

Office action mailed on Nov. 18, 2014 for the Taiwan application No. 101142428, filing date: Nov. 14, 2012, p. 1-5.

Office action mailed on Aug. 31, 2015 for the China application No. 201210520749.X, filing date Dec. 6, 2012.

* cited by examiner

METHOD FOR PERFORMING INFORMATION MONITORING CONTROL OF AT LEAST ONE TARGET DIVISION BLOCK OF AT LEAST ONE WEB PAGE WITH AID OF AT LEAST ONE MONITORING CONTROL SERVER, AND ASSOCIATED APPARATUS AND ASSOCIATED MONITORING SYSTEM

BACKGROUND OF THE INVENTION

1. Field of the Invention

The present invention relates to a monitoring control service provided through an electronic device, and more particularly, to a method for performing information monitoring control, and to an associated apparatus and an associated monitoring system.

2. Description of the Prior Art

A conventional portable electronic device such as a multifunctional mobile phone or a personal digital assistant (PDA) can be very helpful to an end user, and more particularly, can be utilized for viewing web pages when needed. According to the related art, a browser can be triggered to run on the conventional portable electronic device for the purpose of viewing web pages. Some problems may occur when such a browser is utilized. For example, in a situation where multiple programs are running on the conventional portable electronic device, the additional loading due to the browser may cause the conventional portable electronic device to operate abnormally since the hardware resources of the conventional portable electronic device are typically limited. In another example, in a situation where the end user is utilizing a specific program to do something and still cares about the latest status of a topic, the end user may be forced to switch between the browser and the specific program since the size of the screen implemented within the conventional portable electronic device is limited. As the related art does not serve the end user well, a novel method is required for providing a monitoring control service through an electronic device.

SUMMARY OF THE INVENTION

It is therefore an objective of the claimed invention to provide a method for performing information monitoring control, and to provide an associated apparatus and an associated monitoring system, in order to solve the above-mentioned problems.

According to a preferred embodiment, a method for performing information monitoring control is provided, where the method is applied to an electronic device. The method comprises: detecting at least one target division block of at least one web page according to user gesture input information and determining subscription information corresponding to the target division block, wherein the web page comprising the target division block is provided by at least one web server; and sending the subscription information to at least one monitoring control server to subscribe to a monitored version of the target division block, for being displayed/output by utilizing the electronic device.

According to a preferred embodiment, an associated apparatus for performing information monitoring control is provided, where the apparatus comprises at least one portion of an electronic device. The apparatus comprises a processing circuit arranged to control operations of the electronic device. In particular, the processing circuit comprises a detection module and a monitoring control module. The detection module is arranged to detect at least one target division block of at least one web page according to user gesture input information and to determine subscription information corresponding to the target division block, wherein the web page comprising the target division block is provided by at least one web server. In addition, the monitoring control module is arranged to send the subscription information to at least one monitoring control server to subscribe to a monitored version of the target division block, for being displayed/output by utilizing the electronic device.

According to a preferred embodiment, an associated monitoring system for performing information monitoring control is provided. The monitoring system comprises at least one monitoring control server arranged to provide a monitoring control service, and further comprises an electronic device comprising a processing circuit arranged to control operations of the electronic device. In particular, the processing circuit comprises a detection module and a monitoring control module. The detection module is arranged to detect at least one target division block of at least one web page according to user gesture input information and to determine subscription information corresponding to the target division block, wherein the web page comprising the target division block is provided by at least one web server. In addition, the monitoring control module is arranged to send the subscription information to at least one monitoring control server to subscribe to a monitored version of the target division block, for being displayed/output by utilizing the electronic device. Additionally, the monitoring control server generates the monitored version of the target division block according to the subscription information.

According to at least one preferred embodiment, a computer program product is also provided, where the computer program product has program instructions for instructing a processor to perform a method comprising the steps of: detecting at least one target division block of at least one web page according to user gesture input information and determining subscription information corresponding to the target division block, wherein the web page comprising the target division block is provided by at least one web server; and sending the subscription information to at least one monitoring control server to subscribe to a monitored version of the target division block, for being displayed/output by utilizing the electronic device.

It is an advantage of the present invention that the present invention method and apparatus allow the content(s) of the target division block of the web page to be monitored, having no need to utilize a browser, where the monitoring region for displaying the monitored version of the target division block can be arbitrarily designed by the user during the user designated cropping operation, based upon the need of the user. As a result, the goal of providing the monitoring control service through the electronic device can be achieved, where the related art problems will no longer be an issue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
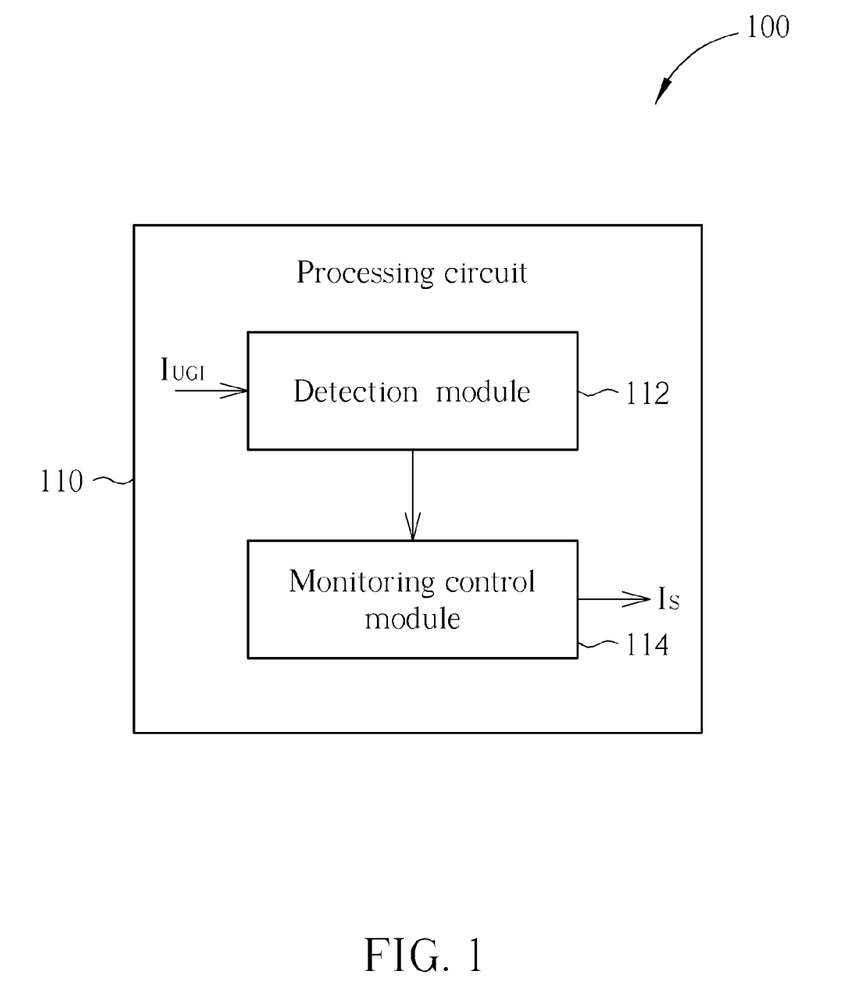
FIG. 1 is a diagram of an apparatus for performing information monitoring control according to an example.

Please refer to FIG. 1, which illustrates a diagram of an apparatus 100 for performing information monitoring control according to an example, where the apparatus 100 may comprise at least one portion (e.g. a portion or all) of an electronic device. For example, the apparatus 100 may comprise a portion of the electronic device mentioned above (e.g. a control circuit such as an integrated circuit (IC) within the electronic device). In another example, the apparatus 100 can be the whole of the electronic device. Examples of the electronic device may include, but not limited to, a mobile phone (e.g. a multifunctional mobile phone), a mobile computer (e.g. tablet computer) and a personal digital assistant (PDA). As shown in FIG. 1, the apparatus 100 may comprise a processing circuit 110 arranged to control operations of the electronic device, and further comprise a wireless communication module (not shown) arranged to access one or more servers outside the electronic device. This is for illustrative purposes only, and is not meant to be a limitation. According to some variations of the example shown in FIG. 1, the wireless communication module can be replaced with a wired communication module (not shown) arranged to access the aforementioned one or more servers outside the electronic device.

According to the example shown in FIG. 1, the processing circuit 110 may comprise a detection module 112 and a monitoring control module 114. The detection module 112 is arranged to detect at least one target division block of at least one web page according to user gesture input information $I_{UGI}$ (e.g. the information obtained by detecting the user gesture input of the user, such as the user gesture input that the user manipulated on a touch screen) and to determine subscription information $I_S$ corresponding to the target division block, where the web page comprising the target division block is provided by at least one web server. In addition, the monitoring control module 114 is arranged to send the subscription information $I_S$ to at least one monitoring control server to subscribe to a monitored version of the target division block, for being displayed/output by utilizing the electronic device.

In some examples, such as some variations of the example shown in FIG. 1, the processing circuit 110 can be implemented with a processor (not shown) executing at least one program code, and the processor executing the program code may perform the operates of the modules/units/components within the processing circuit 110 illustrated in FIG. 1, respectively, where the program code mentioned above may be stored in a storage unit in advance and retrieved by the processing circuit 110, for running on the processing circuit 110.

In some examples, such as some variations of the example shown in FIG. 1, a monitoring system may comprise at least one monitoring control server (e.g. the monitoring control server mentioned above) arranged to provide a monitoring control service, and further comprise an electronic device such as that mentioned above, where the electronic device of these examples may comprise a processing circuit such as the processing circuit 110 shown in FIG. 1. More particularly, the monitoring control server is capable of generating the monitored version of the target division block according to the subscription information $I_S$, in order to provide the monitoring control service through the electronic device.

Figure 2:
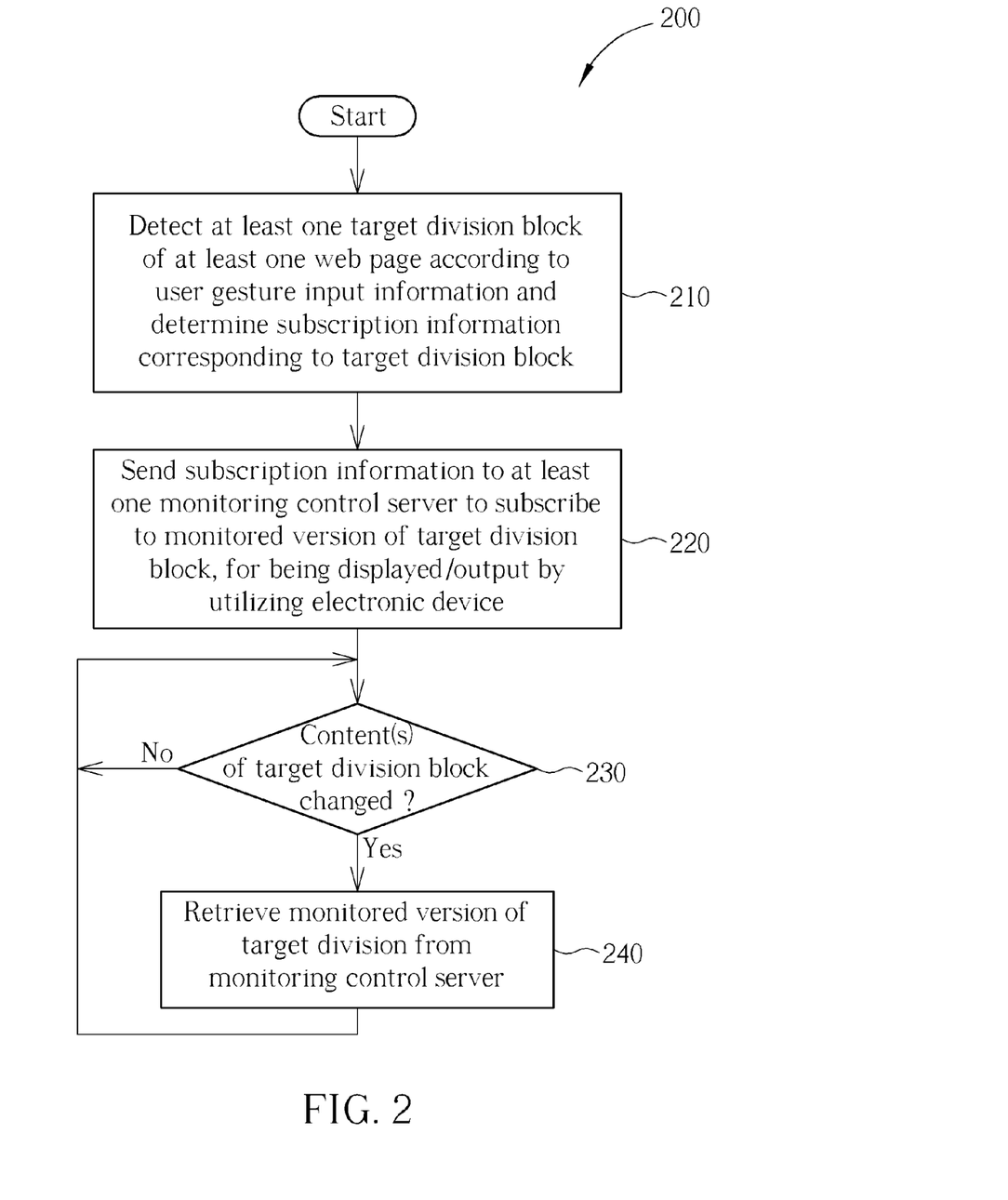
FIG. 2 illustrates a flowchart of a method for performing information monitoring control according to an example.

FIG. 2 illustrates a flowchart of a method 200 for performing information monitoring control according to an example. The method shown in FIG. 2 can be applied to the apparatus 100 shown in FIG. 1. For example, the program code mentioned above may be provided through a computer program product having program instructions for instructing a processor such as that mentioned above to perform the method 200 shown in FIG. 2, where the computer program product may be implemented as a non-transitory computer-readable medium (e.g. a floppy disk or a compact disc-read only memory (CD-ROM)) storing the program instructions or an equivalent version thereof, such as a software package for being installed. The method is described as follows.

In Step 210, the detection module 112 detects at least one target division block (e.g. one or more target division blocks) of at least one web page (e.g. one or more web pages) according to the user gesture input information $I_{UGI}$ and determines the subscription information $I_S$ corresponding to the target division block, where the web page comprising the target division block is provided by at least one web server (e.g. one or more web servers). For example, the web page may comprise multiple division blocks, and the user is interested in a specific division block of the division blocks and wants to monitor the content(s) of the specific division block. Thus, the specific division block can be regarded as the target division block.

In Step 220, the monitoring control module 114 sends the subscription information $I_S$ to at least one monitoring control server (e.g. one or more monitoring control servers) to subscribe to a monitored version of the target division block, for being displayed/output by utilizing the electronic device. For example, the monitored version of the target division block is converted from the target division block of the web page according to a compression format. More particularly, the monitored version of the target division block may comprise at least one partial image (e.g. one or more partial images) of a screenshot of the web page, the partial image corresponding to the target division block of the web page (e.g. one or more partial images corresponding to the aforementioned one or more target division blocks of the aforementioned one or more web pages).

In Step 230, the monitoring control module 114 checks whether content(s) of the target division block is changed. For example, the monitoring control module 114 may wait for notification information from the monitoring control server. More particularly, the monitoring control server may get information of the web page from the web server multiple times to determine whether the content(s) of the target division block is changed. When it is detected that the content(s) of the target division block is changed, the monitoring control server sends the notification information to the electronic device, in order to notify the electronic device (more particularly, the monitoring control module 114) that the content(s) of the target division block is changed. When it is detected that the content(s) of the target division block is changed, Step 240 is entered; otherwise, Step 230 is re-entered to wait.

In Step 240, the monitoring control module 114 retrieves the monitored version of the target division from the monitoring control server. According to the example shown in FIG. 2, the operation of Step 240 is performed when the detection result of Step 230 indicates that the content(s) of the target division block is changed. In a situation where the notification information mentioned above is taken as an example of the mechanism for determining the detection result of Step 230, the monitoring control module 114 is capable of selectively retrieve the monitored version of the target division from the monitoring control server according to whether the notification information is received. Thus, when Step 240 is entered, in response to the notification information, the monitoring control module 114 retrieves the monitored version of the target division from the monitoring control server.

According to the example shown in FIG. 2, in response to user control represented by the user gesture input information $I_{UGI}$, the processing circuit 110 performs a user designated cropping operation on displayed content(s) of the web page to extract at least one portion of the target division block, for being displayed in a monitoring region on a screen (e.g. a touch screen of the electronic device, such as that mentioned above). For example, during the user designated cropping operation, the processing circuit 110 may extract the whole of the target division block. In another example, during the user designated cropping operation, the processing circuit 110 may extract at least one partial image (e.g. one or more partial images) of a screenshot of the web page, the partial image corresponding to the target division block of the web page (e.g. one or more partial images corresponding to the aforementioned one or more target division blocks of the aforementioned one or more web pages). More particularly, the partial image corresponds to the whole of the target division block of the web page, where the partial image can be a scaled image of the whole of the target division block. In addition, when receiving the monitored version of the target division block, the monitoring control module 114 replaces the extracted portion of the target division block with the monitored version of the target division block. Thus, the content(s) within the monitoring region is updated. As a result, the user can obtain the latest change of any topic/issue/event under consideration.

In practice, in response to the user control represented by the user gesture input information, the processing circuit 110 can embed the aforementioned at least one portion of the target division block in a window of a program/application, where the monitoring region may occupy a portion of the window. This is for illustrative purposes only, and is not meant to be a limitation. According to some variations of the example shown in FIG. 2, in response to the user control represented by the user gesture input information, the processing circuit 110 may embed the aforementioned at least one portion of the target division block in a user interface of a program/application, where the monitoring region may occupy a portion of the user interface.

In addition, the monitoring control server may convert the target division block of the web page into the monitored version of the target division block according to the compression format, where the compression format can be an image compression format in a situation where the monitored version of the target division block comprises the aforementioned partial image corresponding to the target division block of the web page.

Figure 3:
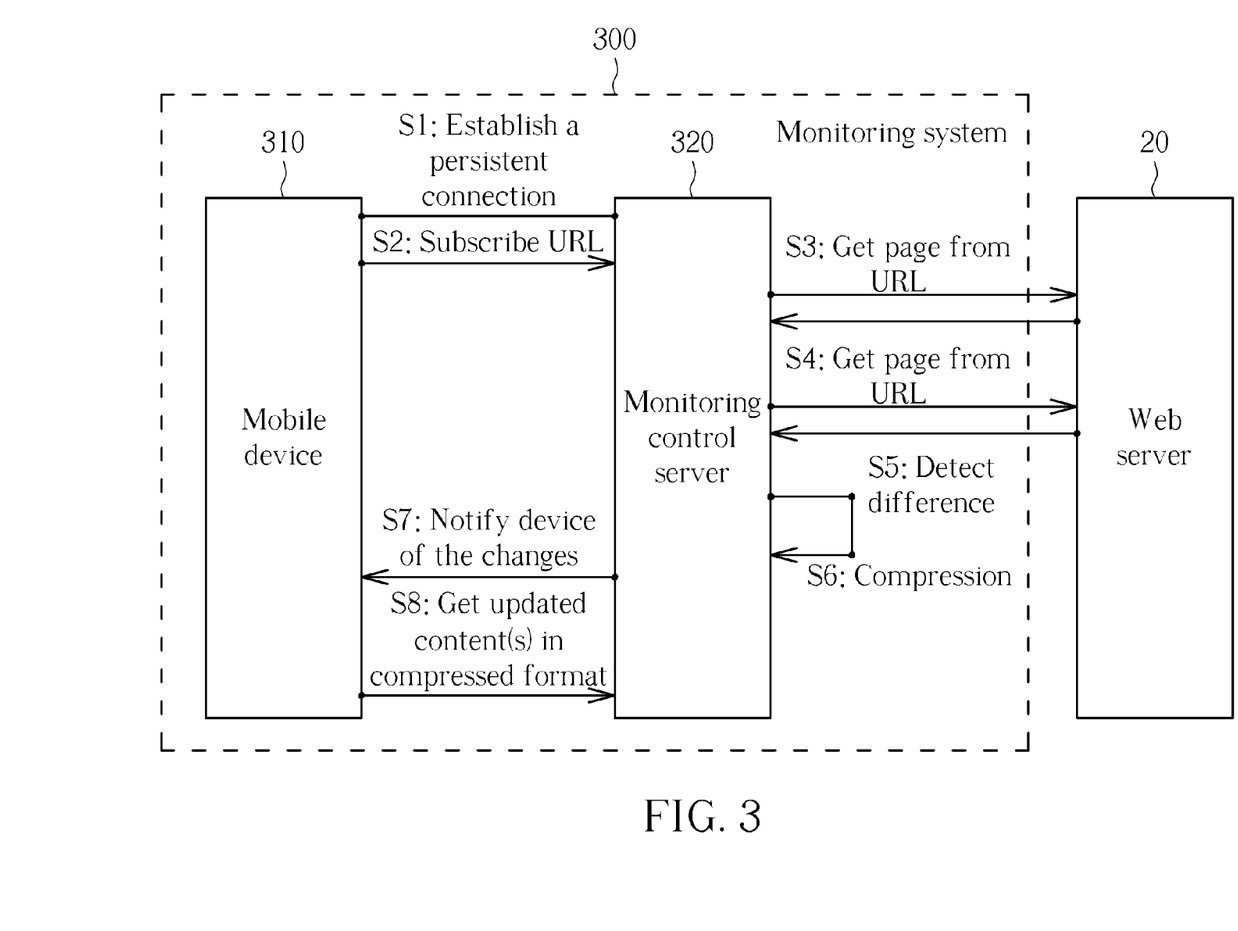
FIG. 3 illustrates a monitoring system performing some operations of a working flow involved with the method shown in FIG. 2 according to an example.

FIG. 3 illustrates a monitoring system 300 performing some operations of a working flow involved with the method 200 shown in FIG. 2 according to an example. The monitoring system 300, the mobile device 310 therein, the monitoring control server 320 therein, and the web server 20 can be taken as examples of the monitoring system, the electronic device, the monitoring control server, and the web server mentioned in the example shown in FIG. 2, respectively. The working flow of the example shown in FIG. 3 comprises some steps {S1, S2, S3, S4, S5, S6, S7, S8}, which are described as follows:

S1: The mobile device 310 and the monitoring control server 320 establish a persistent connection.

S2: The mobile device 310 subscribes by utilizing the subscription information comprising a Uniform/Universal Resource Locator (URL) of the web page (labeled "S2: Subscribe URL").

S3: The monitoring control server 320 gets the web page from the URL (labeled "S3: Get page from URL"). As a result, the web server 20 replies in response to S3, and the monitoring control server 320 receives the reply (more particularly, the contents of the web page) from the web server 20.

S4: The monitoring control server 320 gets the web page from the URL (labeled "S4: Get page from URL"). As a result, the web server 20 replies in response to S3, and the monitoring control server 320 receives the reply (more particularly, the contents of the web page) from the web server 20.

S5: The monitoring control server 320 detects the difference (e.g. the change(s) of the target division block).

S6: The monitoring control server 320 performs compression.

S7: The monitoring control server 320 notifies the mobile device 310 of the change/changes (labeled "S7: Notify device of the changes").

S8: The mobile device 310 gets the updated content(s) (more particularly, the aforementioned monitored version of the target division block) in a compressed format such as the compression format mentioned above from the monitoring control server 320.

Figure 4:
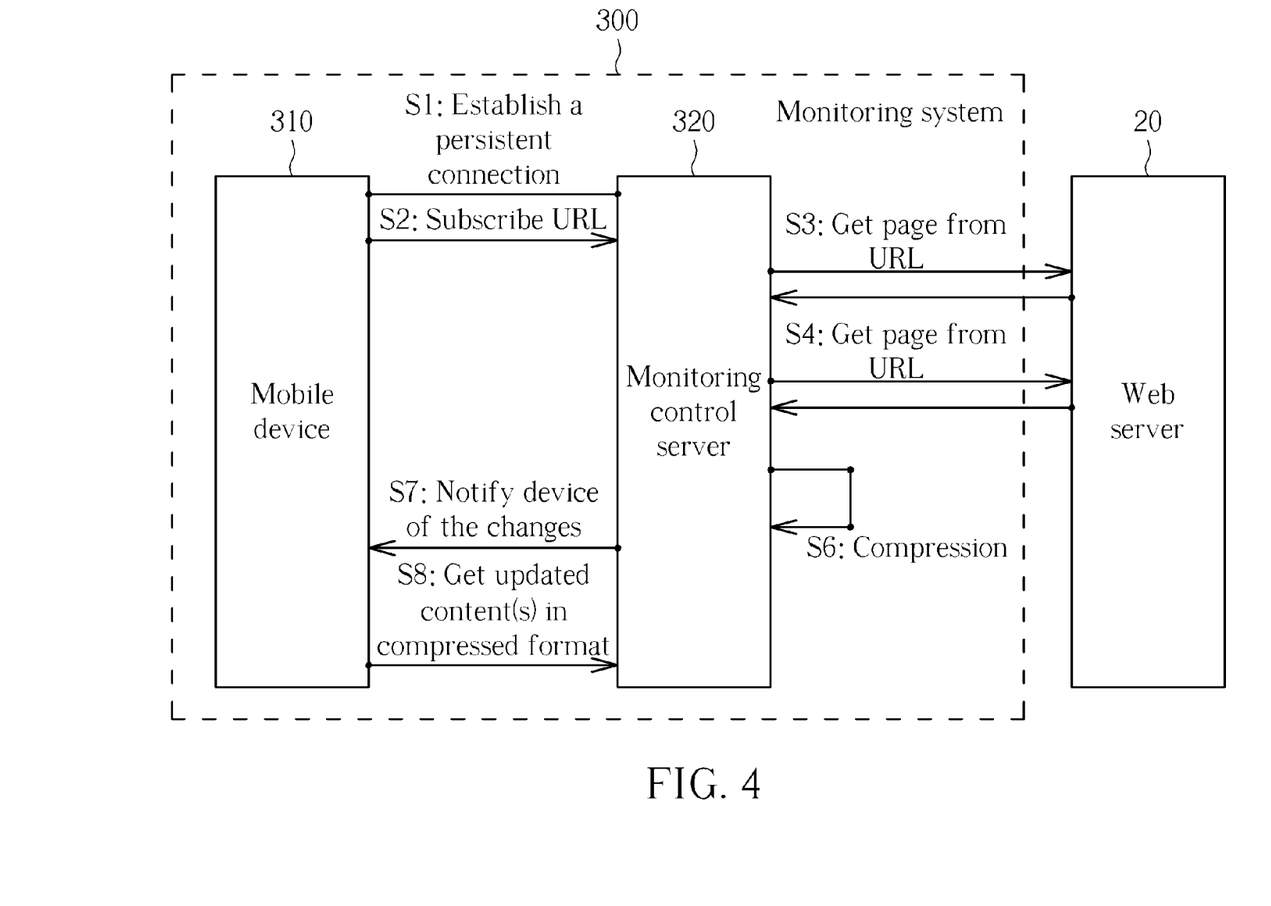
FIG. 4 illustrates a monitoring system performing some operations of a working flow involved with the method shown in FIG. 2 according to another example.

FIG. 4 illustrates a monitoring system 300 performing some operations of a working flow involved with the method 200 shown in FIG. 2 according to another example. The monitoring system 300, the mobile device 310 therein, the monitoring control server 320 therein, and the web server 20 can be taken as examples of the monitoring system, the electronic device, the monitoring control server, and the web server mentioned in the example shown in FIG. 2, respectively. In comparison with the working flow of the example shown in FIG. 3, at least one step such as S5 is omitted. Similar descriptions are not repeated in detail for the example shown in FIG. 4.

Figure 5:
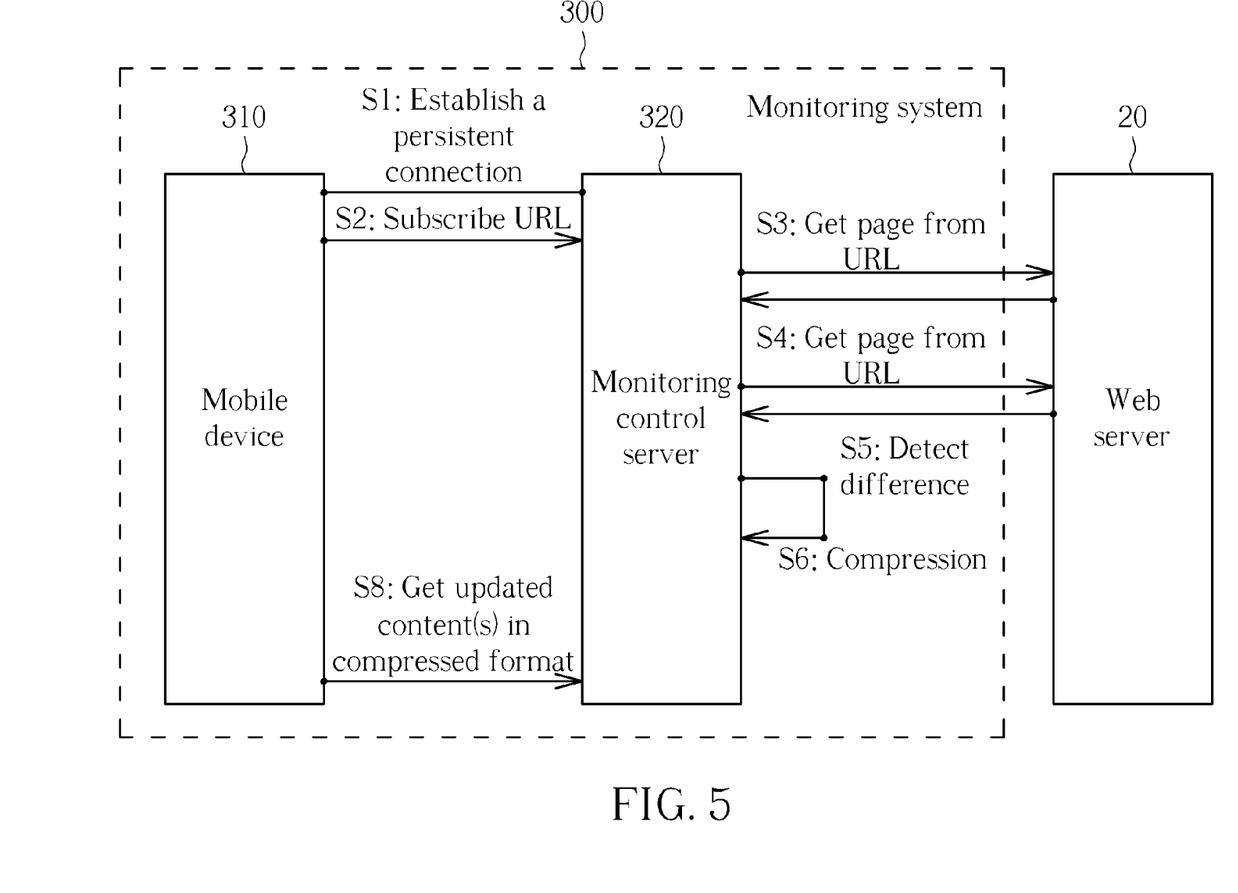
FIG. 5 illustrates a monitoring system performing some operations of a working flow involved with the method shown in FIG. 2 according to yet another example.

FIG. 5 illustrates a monitoring system 300 performing some operations of a working flow involved with the method 200 shown in FIG. 2 according to yet another example. The monitoring system 300, the mobile device 310 therein, the monitoring control server 320 therein, and the web server 20 can be taken as examples of the monitoring system, the electronic device, the monitoring control server, and the web server mentioned in the example shown in FIG. 2, respectively. In comparison with the working flow of the example shown in FIG. 3, at least one step such as S7 is omitted, where the mobile device 310 can actively perform associated step(s) such as S8 (e.g. the operations disclosed in Step 240), having no need to wait for any notification information such as that mentioned above. Similar descriptions are not repeated in detail for the example shown in FIG. 5.

According to an aspect, the aforementioned computer program product can be composed of several code segments. In addition, after these code segments are loaded into the apparatus 100 (more particularly, the processing circuit 110) and are executed, the steps and features of the method shown in FIG. 2 can be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing information monitoring control, the method being applied to an electronic device, the method comprising:
   detecting at least one target division block of at least one web page according to user gesture input information and determining subscription information corresponding to the target division block, rather than a whole of the web page, wherein the web page comprising the target division block is provided by at least one web server; and
   sending the subscription information to at least one monitoring control server, rather than the electronic device and the web server, to subscribe to a monitored version of the target division block, for being displayed or output by utilizing the electronic device, wherein both of the monitoring control server and the web server are positioned outside the electronic device, and the monitoring control server is positioned outside the web server;
   wherein the target division block of the web page is monitored without utilizing a browser.

2. The method of claim 1, further comprising:
   in response to user control represented by the user gesture input information, performing a user designated cropping operation on at least one displayed content of the web page to extract at least one portion of the target division block, for being displayed in a monitoring region on a screen; and
   when receiving the monitored version of the target division block, replacing the extracted portion of the target division block with the monitored version of the target division block.

3. The method of claim 2, wherein the step of performing the user designated cropping operation on the at least one displayed content of the web page to extract the at least one portion of the target division block further comprises:
   in response to the user control represented by the user gesture input information, embedding the at least one portion of the target division block in a window of a program or application, wherein the monitoring region occupies a portion of the window.

4. The method of claim 1, wherein the monitored version of the target division block is converted from the target division block of the web page according to a compression format.

5. The method of claim 4, wherein the monitored version of the target division block comprises at least one partial image of a screenshot of the web page, the partial image corresponding to the target division block of the web page.

6. The method of claim 1, further comprising:
   when it is detected that at least one content of the target division block is changed, retrieving the monitored version of the target division from the monitoring control server.

7. An apparatus for performing information monitoring control, the apparatus comprising at least one portion of an electronic device, the apparatus comprising:
   a processing circuit arranged to control operations of the electronic device, wherein the processing circuit comprises:
     a detection circuit arranged to detect at least one target division block of at least one web page according to user gesture input information and to determine subscription information corresponding to the target division block, rather than a whole of the web page, wherein the web page comprising the target division block is provided by at least one web server; and
     a monitoring control circuit arranged to send the subscription information to at least one monitoring control server, rather than the electronic device and the web server, to subscribe to a monitored version of the target division block, for being displayed or output by utilizing the electronic device, wherein both of the monitoring control server and the web server are positioned outside the electronic device, and the monitoring control server is positioned outside the web server;
   wherein the target division block of the web page is monitored without utilizing a browser.

8. The apparatus of claim 7, wherein in response to user control represented by the user gesture input information, the processing circuit performs a user designated cropping operation on at least one displayed content of the web page to extract at least one portion of the target division block, for being displayed in a monitoring region on a screen; and when receiving the monitored version of the target division block, the monitoring control circuit replaces the extracted portion of the target division block with the monitored version of the target division block.

9. The apparatus of claim 8, wherein in response to the user control represented by the user gesture input information, the processing circuit embeds the at least one portion of the target division block in a window of a program or application; and the monitoring region occupies a portion of the window.

10. The apparatus of claim 7, wherein the monitored version of the target division block is converted from the target division block of the web page according to a compression format.

11. The apparatus of claim 10, wherein the monitored version of the target division block comprises at least one partial image of a screenshot of the web page, the partial image corresponding to the target division block of the web page.

12. The apparatus of claim 7, wherein when it is detected that at least one content of the target division block is changed, the monitoring control circuit retrieves the monitored version of the target division from the monitoring control server.

13. A monitoring system for performing information monitoring control, the monitoring system comprising:
   at least one monitoring control server arranged to provide a monitoring control service; and
   an electronic device comprising a processing circuit arranged to control operations of the electronic device, wherein the processing circuit comprises:
     a detection circuit arranged to detect at least one target division block of at least one web page according to user gesture input information and to determine subscription information corresponding to the target division block, rather than a whole of the web page, wherein the web page comprising the target division block is provided by at least one web server; and a monitoring control circuit arranged to send the subscription information to the monitoring control server, rather than the electronic device and the web server, to subscribe to a monitored version of the target division block, for being displayed or output by utilizing the electronic device, wherein both of the monitoring control server and the web server are positioned outside the electronic device, and the monitoring control server is positioned outside the web server;

wherein the monitoring control server generates the monitored version of the target division block according to the subscription information; and the target division block of the web page is monitored without utilizing a browser.

14. The monitoring system of claim 13, wherein in response to user control represented by the user gesture input information, the processing circuit performs a user designated cropping operation on at least one displayed content of the web page to extract at least one portion of the target division block, for being displayed in a monitoring region on a screen; and when receiving the monitored version of the target division block, the monitoring control circuit replaces the extracted portion of the target division block with the monitored version of the target division block.

15. The monitoring system of claim 14, wherein in response to the user control represented by the user gesture input information, the processing circuit embeds the at least one portion of the target division block in a window of a program or application; and the monitoring region occupies a portion of the window.

16. The monitoring system of claim 13, wherein the monitoring control server converts the target division block of the web page into the monitored version of the target division block according to a compression format.

17. The monitoring system of claim 16, wherein the monitored version of the target division block comprises at least one partial image of a screenshot of the web page, the partial image corresponding to the target division block of the web page.

18. The monitoring system of claim 13, wherein when it is detected that at least one content of the target division block is changed, the monitoring control circuit retrieves the monitored version of the target division from the monitoring control server.

19. The monitoring system of claim 18, wherein when it is detected that at least one content of the target division block is changed, the monitoring control server sends notification information to the electronic device; and in response to the notification information, the monitoring control circuit retrieves the monitored version of the target division from the monitoring control server.

20. The monitoring system of claim 13, wherein the monitoring control server gets information of the web page from the web server multiple times to determine whether at least one content of the target division block is changed; and when it is detected that the at least one content of the target division block is changed, the monitoring control server sends notification information to the electronic device.

* * * * *